(12) United States Patent
Mack

(10) Patent No.: US 11,880,472 B2
(45) Date of Patent: Jan. 23, 2024

(54) GENERATING AND DISSEMINATING MOCK DATA FOR CIRCUMVENTING DATA SECURITY BREACHES

(71) Applicant: BANK OF AMERICA CORPORATION, Charlotte, NC (US)

(72) Inventor: Nia Mack, Addison, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 338 days.

(21) Appl. No.: 17/149,517

(22) Filed: Jan. 14, 2021

(65) Prior Publication Data

US 2022/0222356 A1 Jul. 14, 2022

(51) Int. Cl.
*G06F 21/60* (2013.01)
*G06F 21/62* (2013.01)
*G06F 21/55* (2013.01)

(52) U.S. Cl.
CPC ............. *G06F 21/60* (2013.01); *G06F 21/55* (2013.01); *G06F 21/6218* (2013.01)

(58) Field of Classification Search
CPC ....... G06F 21/60; G06F 21/55; G06F 21/6218
See application file for complete search history.

(56) References Cited

U.S. PATENT DOCUMENTS

| 8,463,892 | B2 * | 6/2013 | Troyansky | H04L 63/1408 709/224 |
|---|---|---|---|---|
| 8,874,528 | B1 * | 10/2014 | Banerjee | G06F 16/217 707/694 |
| 9,374,363 | B1 * | 6/2016 | Paczkowski | G06F 21/32 |
| 9,639,714 | B1 * | 5/2017 | Carlson | G06F 3/04886 |
| 9,785,795 | B2 * | 10/2017 | Grondin | G06F 21/6227 |
| 10,275,613 | B1 * | 4/2019 | Olenoski | H04L 63/20 |
| 10,403,392 | B1 * | 9/2019 | Chandrasekaran | G16H 10/60 |
| 10,419,219 | B1 * | 9/2019 | Wieker | H04W 12/04 |
| 11,106,801 | B1 * | 8/2021 | Levine | G06F 11/3692 |
| 11,132,403 | B2 * | 9/2021 | Hunter | G06F 21/64 |
| 11,201,728 | B1 * | 12/2021 | Bouchard | H04L 9/0637 |
| 11,563,765 | B2 * | 1/2023 | e Silva | H04L 63/1425 |
| 2008/0275829 | A1 * | 11/2008 | Stull | H04L 9/00 726/26 |
| 2012/0030767 | A1 * | 2/2012 | Rippert, Jr. | G06Q 10/10 726/25 |
| 2012/0158953 | A1 * | 6/2012 | Barnes | H04L 63/04 709/224 |
| 2013/0054650 | A1 * | 2/2013 | O'Byrne | G06F 21/6227 707/E17.005 |
| 2015/0082399 | A1 * | 3/2015 | Wu | H04L 9/0897 726/10 |

(Continued)

*Primary Examiner* — Jason Chiang
(74) *Attorney, Agent, or Firm* — Moore & Van Allen PLLC; James C. Edwards

(57) ABSTRACT

Modified data records, including mock data, are generated and disseminated in response to determining that a data breach has occurred resulting in the data records being released or otherwise made available at an Internet website. The modified data records are posted or otherwise made available at the same Internet site at which the original data records are posted or otherwise are available. The modified data records are made to be more enticing to a would-be acquirer of the data than the original data records by containing significantly more records than the original data records and/or be offered to the would-be acquirer at better terms.

12 Claims, 4 Drawing Sheets

(56) References Cited

U.S. PATENT DOCUMENTS

| | | | | |
|---|---|---|---|---|
| 2015/0154520 | A1* | 6/2015 | Federgreen | G06Q 30/018 705/7.11 |
| 2015/0193638 | A1* | 7/2015 | Cook | G06F 16/245 726/27 |
| 2015/0373043 | A1* | 12/2015 | Wang | G06F 21/6254 706/12 |
| 2016/0148332 | A1* | 5/2016 | Stibel | H04L 67/53 705/44 |
| 2016/0323301 | A1* | 11/2016 | Boss | G06F 21/577 |
| 2017/0134423 | A1* | 5/2017 | Sysman | G06F 21/554 |
| 2017/0244554 | A1* | 8/2017 | Feliciano | H04L 9/0869 |
| 2017/0264640 | A1* | 9/2017 | Narayanaswamy | H04L 63/0281 |
| 2018/0053016 | A1* | 2/2018 | Horesh | G06F 21/53 |
| 2019/0042791 | A1* | 2/2019 | Dinov | G06F 17/18 |
| 2019/0171846 | A1* | 6/2019 | Conikee | G06F 21/577 |
| 2019/0372759 | A1* | 12/2019 | Rix | H04L 9/0838 |
| 2019/0386969 | A1* | 12/2019 | Verzun | G06F 21/606 |
| 2020/0050773 | A1* | 2/2020 | Schroeder | H04L 63/107 |
| 2020/0050795 | A1* | 2/2020 | Solomon | G06F 16/2255 |
| 2020/0065480 | A1* | 2/2020 | Gu | G06F 21/64 |
| 2020/0151351 | A1* | 5/2020 | Skourtis | G06F 21/6254 |
| 2020/0193018 | A1* | 6/2020 | Van Dyke | G06F 21/552 |
| 2020/0250326 | A1* | 8/2020 | Araújo | G06Q 10/10 |
| 2020/0267144 | A1* | 8/2020 | Wagner | G06F 21/6245 |
| 2020/0279050 | A1* | 9/2020 | Endler | G06F 9/542 |
| 2020/0293684 | A1* | 9/2020 | Harris | H04W 12/02 |
| 2020/0311631 | A1* | 10/2020 | Hecht | G06F 21/6245 |
| 2021/0006573 | A1* | 1/2021 | Britt | G06F 16/258 |
| 2021/0042408 | A1* | 2/2021 | Van Dyke | G06F 21/552 |
| 2021/0049527 | A1* | 2/2021 | Beaumont | G06Q 50/265 |
| 2021/0097201 | A1* | 4/2021 | Wasicek | G06F 21/32 |
| 2021/0126926 | A1* | 4/2021 | Kaidi | H04L 43/08 |
| 2021/0160281 | A1* | 5/2021 | Hallaji | H04L 63/083 |
| 2021/0334384 | A1* | 10/2021 | Ranjan | G06F 11/3636 |
| 2022/0050923 | A1* | 2/2022 | Chen Kaidi | G06F 21/606 |
| 2022/0129583 | A1* | 4/2022 | Balasubramanian | G06F 9/451 |
| 2022/0156388 | A1* | 5/2022 | Kaczorowski | G06F 16/215 |
| 2023/0010686 | A1* | 1/2023 | Lesh | G16H 50/20 |

* cited by examiner

GENERATING AND DISSEMINATING MOCK DATA FOR CIRCUMVENTING DATA SECURITY BREACHES

FIELD OF THE INVENTION

The present invention relates to data security and, more specifically, in response to determining a data breach that releases or makes available data records at an Internet site, generating modified data records that include mock data (i.e., benign data that is inaccurate but comprehensible data elements) and posting or making available the modified data records at the Internet site.

BACKGROUND

A data breach, by definition, is the release of secure or private/confidential information to an untrusted environment. In an intentional data breach scenario, once a data breach has occurred the perpetrator is prone to release or make available the secure or private/confidential information (e.g., data records or the like) via the Internet. In this regard, the perpetrator may post or make available the data records on a social media site, darknet/web black markets or the like. Once such a data breach occurs and the data is posted or otherwise available via the Internet, it is very difficult, and in some instances impossible, to retrieve, i.e., "claw back" the data or otherwise protect the data.

Therefore, a need exists to develop systems, methods, computer program products and the like that provide for mitigating damages caused by a data breach in which confidential/private data is released or otherwise made available via the Internet. In this regard, the desired systems, methods, computer program products and the like should serve to entice and mislead a would-be acquirer of the confidential/private data and, in certain instances, determine the physical or network location and/or identity of a would-be acquirer of the confidential/private data.

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for generation and dissemination of modified data records in response to determining that a data breach has occurred resulting in the data records being released or otherwise made available at an Internet website. The modified data records, which include so-called mock or benign data (i.e., data elements that have been modified with values that appear real but are actually incorrect) are disseminated (i.e., posted or otherwise made available) to the same Internet site at which the original data records are posted or otherwise are available. In specific embodiments of the invention, the modified data records are made to be more enticing to a would-be acquirer of the data than the original data records. In this regard, the modified data records may contain significantly more records than the original data records and/or be offered to the would-be acquirer at better terms.

In specific embodiments of the invention, the data breach may be determined by monitoring one or more Internet websites (e.g., social media websites, darknet/web black market websites or the like) for a posting that releases or makes available data records associated with the monitoring entity. In such embodiments of the invention, determination of a data breach may provide for real-time or near-real-time generation and dissemination of the modified data records at the Internet site, so as to minimize the likelihood that a would-be acquired would acquire the actual data records without first being enticed to acquire the modified data records. In other embodiments of the invention, the data breach may be determined by another cyber security system, which then alerts the systems/processes of the present invention to generate and disseminate the modified data records.

In further specific embodiments of the invention, the generation of the modified data records is undertaken by obfuscation algorithms, such as algorithms that employ maturation fuzzing or the like to make small changes to the data element values that result in values that appear valid but are otherwise invalid. Further, the obfuscation algorithms may be configured to modify/change a predetermined number of data elements in each data record or a random number of data elements. In addition, the obfuscation algorithms may be configured to randomly select data elements for modification or, in other embodiments, the obfuscation algorithms may be configured to select data elements based on predetermined data elements attributes (e.g., privacy/confidentiality concerns of a data element, frequency of occurrence of a data element value or the like).

In addition, the invention may provide for monitoring for access/acquisition of the modified data records at the Internet site or monitoring for use of the modified data records within other systems requiring such data. Based on such monitoring determining the occurrence of an access/acquisition of the monitored data, the invention may further provide for determining location (physical and/or network) and/or identity of the accessing/acquiring entity.

As such, the present invention, is able to mitigate likely damages caused by a data breach in which confidential/private data is released or otherwise made available via the Internet. Specifically, the present invention provides for releasing or otherwise making available modified/mock data records to the Internet that are configured so as to be more enticing than the actual previously release or available data records.

A system for data security defines first embodiments of the invention. The system includes a computing platform having a memory and one or processing devices in communication with the memory. The system additionally includes a data obfuscation and dissemination engine that is stored in the memory and executable by the one or more processing devices. The data obfuscation and dissemination engine is configured to determine an occurrence of a data breach of first data records. The data breach releases or makes available the first data records at an Internet website (e.g., social media site, dark web/black market site or the like). The data obfuscation and dissemination engine is further configured to identify (i) a database associated with the first data records, and (ii) the Internet website and, in response, retrieve a plurality of data records including the first data records from the database. The data obfuscation and dissemination engine is further configured to apply one or more obfuscation algorithms to the plurality of data records to generate modified data records that modify at least a portion of the data elements in the plurality of data records. The modified data records comprise inaccurate data elements that are comprehensible (i.e., the modified data records appear to an unknowing user as being authentic data records). Further, the data obfuscation and dissemination engine is configured to disseminate the modified data records to the Internet website.

In specific embodiments of the system, the data obfuscation and dissemination engine is further configured to determine the occurrence of the data breach by monitoring a plurality of Internet websites and determining that the first data records have been posted to or are available at a monitored Internet website. In such embodiments of the system, the data obfuscation and dissemination engine is further configured to disseminate the modified data records by posting the modified data records or an availability of the modified data records at the monitored Internet website.

In other specific embodiments the system further includes one or more cyber security systems that are in network communication with the data obfuscation and dissemination engine. The one or more cyber security systems are configured to determine the occurrence of the data breach of the first data records and notify the data obfuscation and dissemination engine of the data breach.

In further specific embodiments of the system, the one or more obfuscation algorithms are configured to modify a predetermined number of data elements in the plurality of data records. In other specific embodiments of the system, the one or more obfuscation algorithms are configured to randomly select the data elements in the plurality of data records for modification or select the data elements in the plurality of data records for modification based on predetermined data element attributes (e.g., privacy/confidentiality concerns of a data element, commonality of a data element value or the like).

In other specific embodiments of the system, the data obfuscation and dissemination engine is further configured to determine the amount of the plurality of data records to retrieve, modify and disseminate. In specific embodiments of the system, the data obfuscation and dissemination engine is further configured to determine the amount of the plurality of data records based at least on one or more of (i) an amount of the first data records, (ii) type of confidential data in the first data records, and (iii) the Internet website.

In further specific embodiments of the system, the data obfuscation and dissemination engine is further configured to generate a file comprising modified data records and disseminate the file to the Internet website. The file is of a type similar to or same as a type of file containing the first data records released or made available at the Internet website.

In other embodiments the system includes a data access monitoring engine stored in the memory, executable by the one or more processing devices and configured to monitor access to the modified data records at the Internet website, and, based on the monitoring resulting in an access of the modified data records, determine an accessor of the modified data records.

A computer-implemented method for data security defines second embodiments of the invention. The method is executed by one or more computing processor devices. The method includes determining an occurrence of a data breach of first data records. The data breach releases or makes available the first data records at an Internet website. The method further includes identifying (i) a database associated with the first data records, and (ii) the Internet website and retrieving a plurality of data records including the first data records from the database. The method additionally includes generating modified data records that modify at least a portion of the data elements in the plurality of data records. The modified data records comprise inaccurate data elements that are comprehensible. Further, the method includes disseminating the modified data records to the Internet website.

In specific embodiments of the computer-implemented method, determining the occurrence of the data breach further includes monitoring a plurality of Internet websites and determining that the first data records have been posted to or are available at a monitored Internet website. In such embodiments of the computer-implemented method, disseminating the modified data records further includes posting the modified data records or an availability of the modified data records at the monitored Internet website.

In further specific embodiments of the computer-implemented method, determining the occurrence of the data breach further includes receiving a notification from a cyber security system that is configured to notify as to the occurrence the data breach.

In other specific embodiments of the computer-implemented method, generating the modified data records further comprises one selected from a group consisting of (i) randomly selecting the data elements in the plurality of data records for modification, and (ii) selecting, based on predetermined data element attributes, the data elements in the plurality of data records for modification.

A computer program product including a non-transitory computer-readable medium defines third embodiments of the invention. The computer-readable medium includes a first set of codes for causing a computer to determine an occurrence of a data breach of first data records. The data breach releases or makes available the first data records at an Internet website. The computer-readable medium additionally includes a second set of codes for causing a computer to identify (i) a database associated with the first data records, and (ii) the Internet website and a third set of codes for causing a computer to retrieve a plurality of data records including the first data records from the database. Additionally, the computer-readable medium includes a fourth set of codes for causing a computer to generate modified data records that modify at least a portion of the data elements in the plurality of data records. The modified data records comprise inaccurate data elements that are comprehensible. Moreover, the computer-readable medium includes a fifth set of codes for causing a computer to disseminate the modified data records to the Internet website.

In specific embodiments of the computer program product, the first set of codes is further configured to cause the computer to determine the occurrence of the data breach by monitoring a plurality of Internet websites and determining that the first data records have been posted to or are available at a monitored Internet website. In such embodiments of the computer program product, the fifth set of codes is further configured to cause the computer to disseminate the modified data records by posting the modified data records or an availability of the modified data records at the monitored Internet website.

In other specific embodiments of the computer program product, the first set of codes is further configured to cause the computer to determine the occurrence of the data breach by receiving a notification from a cyber security system that is configured to notify as to the occurrence the data breach.

Thus, systems, apparatus, methods, and computer program products herein described in detail below provide for.

BRIEF DESCRIPTION OF THE DRAWINGS

Figure 1:
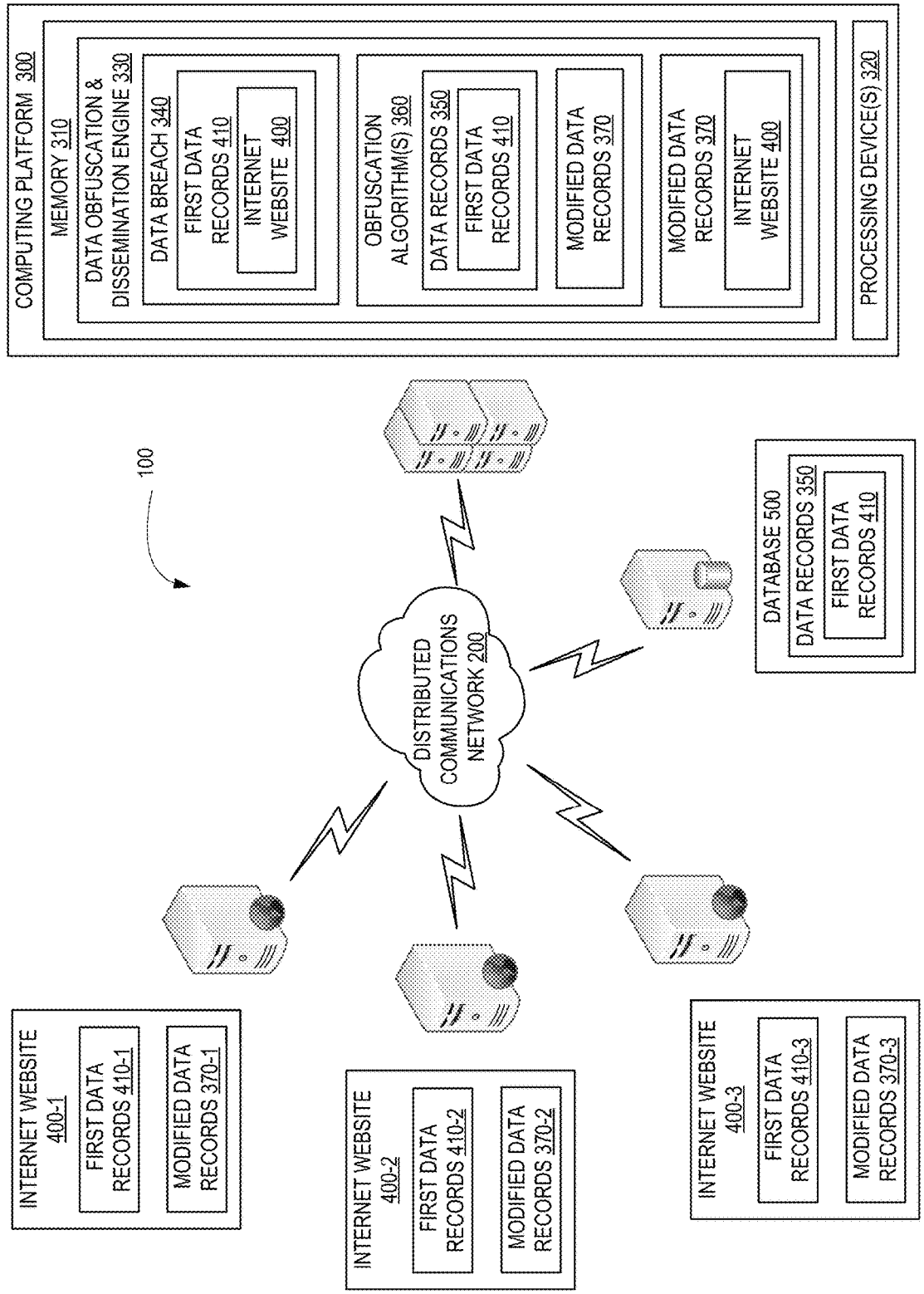
Figure 2:
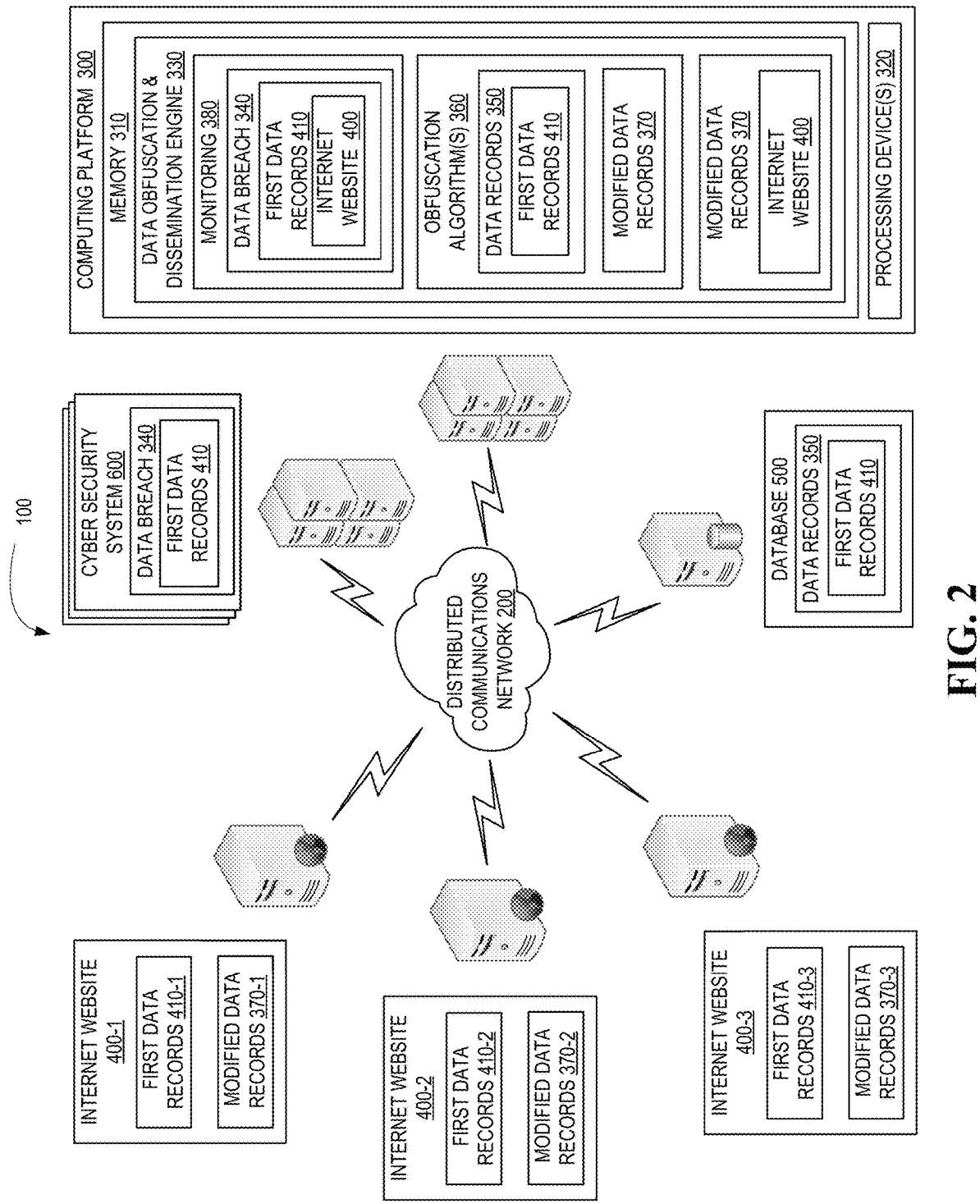
Figure 3:
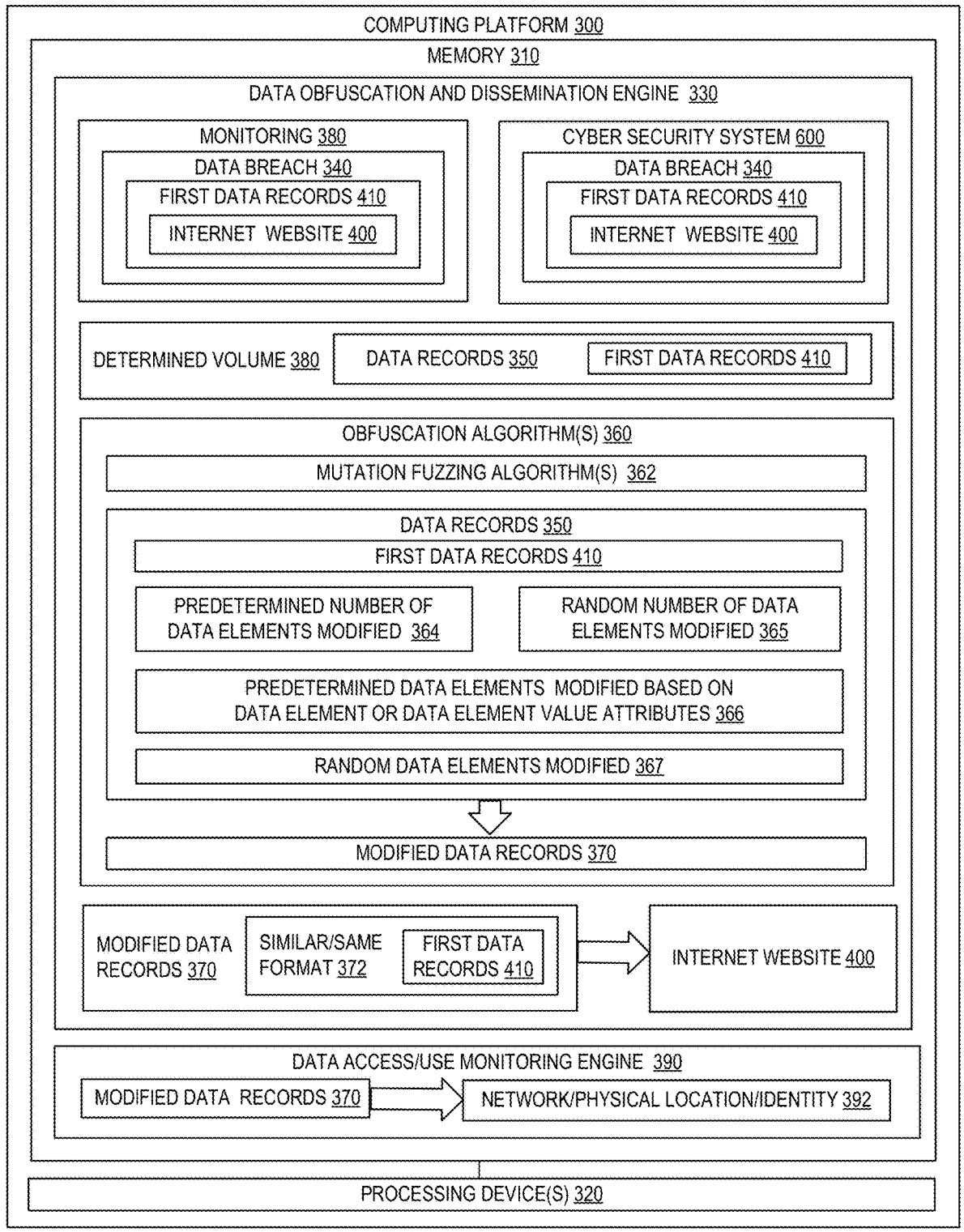
Figure 4:
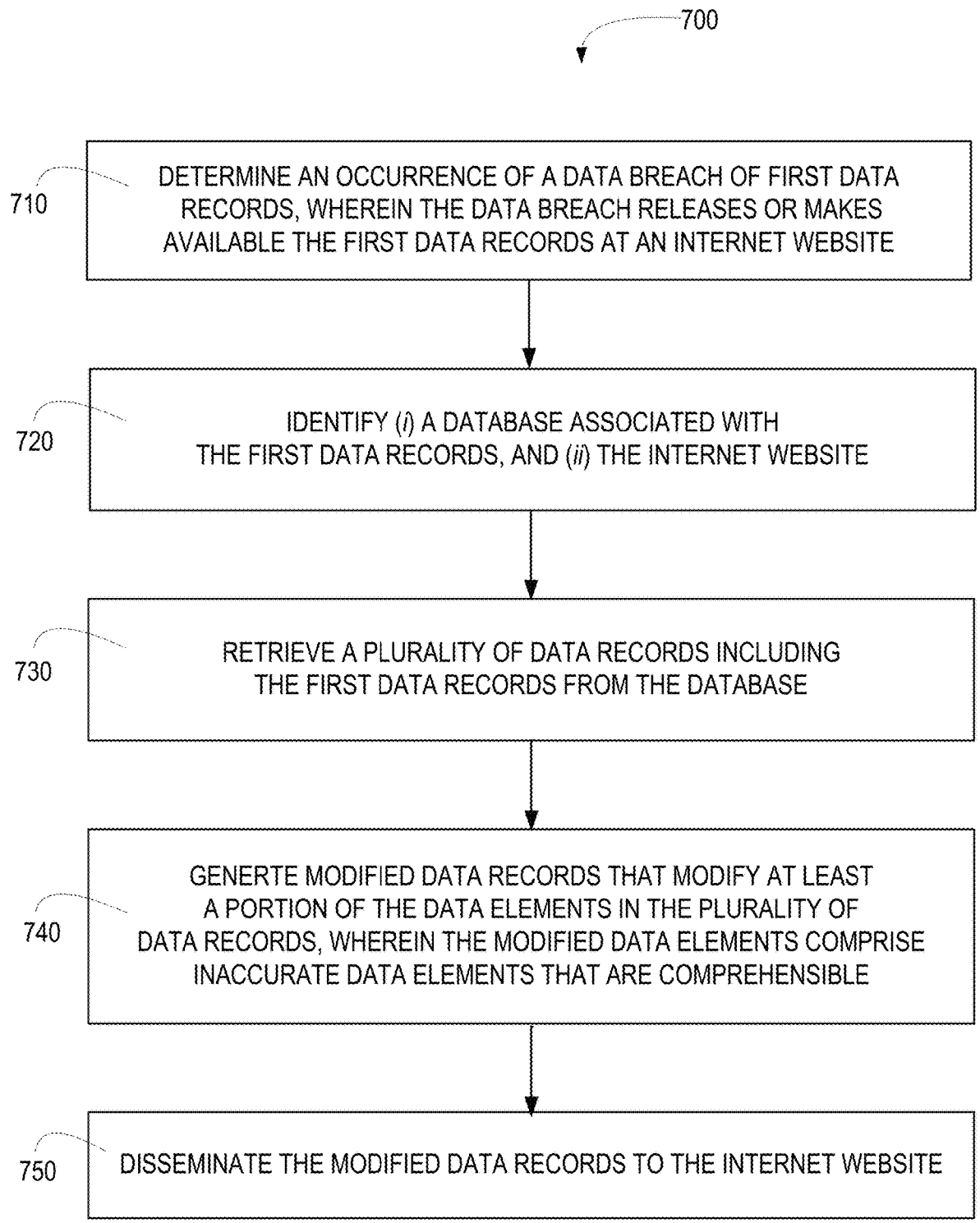

Having thus described embodiments of the invention in general terms, reference will now be made the accompanying drawings, wherein:

FIG. 1 is a schematic/block diagram of a system for data security, specifically generating and disseminating modified data records, including mock/benign data, to Internet websites that post or make available the original data records, in accordance with embodiments of the present invention;

FIG. 2 is a schematic/block diagram of an alternative embodiment system for data security, specifically generating and disseminating modified data records, including mock/benign data, to Internet websites that post or make available the original data records, in accordance with embodiments of the present invention;

FIG. 3 is block diagram of a computing platform including a data obfuscation and dissemination engine, in accordance with embodiments of the present invention;

FIG. 4 is a flow diagram of methodology for data security by generating and disseminating modified data records, including mock/benign data, to Internet websites that post or make available the original data records, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as PYTHON, JAVA, PERL, SMALLTALK, C++, SPARK SQL, HADOOP HIVE or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" or "configured for" perform (or "configured for" performing) a certain function in a variety of ways, including, for example, by having one or more general-purpose circuits perform the function by executing particular computer-executable program code embodied in computer-readable medium, and/or by having one or more application-specific circuits perform the function.

Thus, as described in more detail below, embodiments of the present invention provide for generation and dissemination of modified data records in response to determining that a data breach has occurred resulting in the data records being released or otherwise made available at an Internet website. The modified data records, which include so-called mock/benign data (i.e., data elements that have been modified with values that appear real but are actually incorrect) are disseminated (i.e., posted or otherwise made available) to the same Internet site at which the original data records are posted or otherwise are available. In specific embodiments of the invention, the modified data records are made to be more enticing to a would-be acquirer of the data than the original data records. In this regard, the modified data records may contain significantly more records than the original data records and/or be offered to the would-be acquirer at better terms.

In specific embodiments of the invention, the data breach may be determined by monitoring one or more Internet websites (e.g., social media websites, darknet/web black market websites or the like) for a posting that releases or makes available data records associated with the monitoring entity. In such embodiments of the invention, determination of a data breach may provide for real-time or near-real-time generation and dissemination of the modified data records at the Internet site, so as to minimize the likelihood that a would-be acquired would acquire the actual data records without first being enticed to acquire the modified data records. In other embodiments of the invention, the data breach may be determined by another cyber security system, which then alerts the systems/processes of the present invention to generate and disseminate the modified data records.

In further specific embodiments of the invention, the generation of the modified data records is undertaken by obfuscation algorithms, such as algorithms that employ maturation fuzzing or the like to make small changes to the data element values that result in values that appear valid but are otherwise invalid. Further, the obfuscation algorithms may be configured to modify/change a predetermined number of data elements in each data record or a random number of data elements. In addition, the obfuscation algorithms may be configured to randomly select data elements for modification or, in other embodiments, the obfuscation algorithms may be configured to select data elements based on predetermined data elements attributes (e.g., privacy/confidentiality concerns of a data element, frequency of occurrence of a data element value or the like).

In addition, the invention may provide for monitoring for access/acquisition of the modified data records at the Internet site or monitoring for use of the modified data records within other systems requiring such data. Based on such monitoring determining the occurrence of an access/acquisition of the monitored data, the invention may further provide for determining location (physical and/or network) and/or identity of the accessing/acquiring entity.

As such, the present invention, is able to mitigate likely damages caused by a data breach in which confidential/private data is released or otherwise made available via the Internet. Specifically, the present invention provides for releasing or otherwise making available modified/mock/benign data records to the Internet that are configured so as to be more enticing than the actual previously release or available data records.

Turning now to the figures, FIG. 1 illustrates a system 100 for data security, specifically a system 100 configured for generating and disseminating modified data records, including mock/benign data, to Internet websites that post or make available the original data records, in accordance with embodiments of the present invention. The system includes a computing platform 300 having a memory and at least one processing device 320 in communication with the memory 310. In this regard, computing platform 300 may comprise one or more computing devices, such as application servers or the like.

Memory 310 stored data obfuscation and dissemination engine 330 that is configured to determine an occurrence of a data breach 340 of first data records 410 that are controlled by an entity, such as an enterprise, including a financial institution, e-commerce business, government agency or any other entity that controls confidential, person and/or non-public information. The data breach 340 releases or makes available the first data records 410 at an Internet website 400, such as Internet website 400-1, 400-2, or 400-3. Internet website 400 may include, but is not limited to, a social media website, a bullet board, a black market or the like. In this regard, the Internet websites 400-1, 400-2, or 400-3 may websites (e.g., social media sites or the like) that are accessible via conventional web browsers or may be websites (e.g., black markets or the like) that are accessible via anonymizing web browsers (i.e., so-called browsers configured to access the "dark web").

In response to determining the occurrence of the data breach 340, the data obfuscation and dissemination engine 330 is configured to identify (i) a database 500 storing the first data records, and (ii) the Internet website 400 at which the data breach 340 occurred. In response to accessing the identified database 500 and retrieving a plurality of data records 350 including the first data records 410, the data obfuscation and dissemination engine 330 is configured to apply one or more obfuscation algorithms 360 to the plurality of data records 410 to generate modified data records 370. The modified data records 370 modify at least a portion of the data elements in the plurality of data records 350. The modified data records 370 comprise modified data elements that are inaccurate or false data elements but are otherwise comprehensible to someone who accesses the data (i.e., so-called "mock data"). For example, if the data records include physical addresses, modification may include changing a street number and/or a street name or if the data records include social security numbers changing one or more digits in the social security number. In this regard, the modified data records 370 serve to mislead a would-be accessor/acquirer of the modified data records 370 into believing that they have accessed/acquired valid/real data.

In response to generating the modified data records, the data obfuscation and dissemination engine 330 is configured to disseminate the modified data records 370 to the Internet website 400 at which the data breach 340 is occurring or has occurred. Dissemination may include posting or otherwise making available/offering the modified data records 370 at the Internet website 400 via distributed communication network 200, which includes at least the Internet.

In specific embodiments of the system, the volume of data records 350 that are modified is greater than and, in some instances, significantly greater than the volume of first data records 410. For example, the volume of data records 350 may be 2×, 5×, 10× or the like the volume of first data records 410. The reason for increasing the volume of modified data records 370 versus the volume of the first data records 340 is to entice a would-be accessor/acquirer (i.e., perpetrator/wrongdoer) of the data records to access/acquire the modified data records 370 as opposed to the first data records 410, which include unmodified, valid data. In addition to modified data records 370 being greater than the volume of first data records 410, other means of enticing a would-be accessor/acquirer or making the modified data records 370 more appealing is offering the modified data records 370 at a better rate (i.e., lower cost or lower cost per record than the first data records 410) or generating written dialog within the posting that heightens awareness of the availability of the modified data records 370.

Referring to FIG. 2, a block diagram is depicted of a system 100 for data security highlighting alternate embodiments of the invention. Specifically, the embodiments detailed in FIG. 2 provide for two separate alternatives for the data obfuscation and dissemination engine 330 to determine the occurrence of the data breach 340 of the first data records 410. In first embodiments of the system 100, the data obfuscation and dissemination engine 330 is configured to monitor 380 a plurality of Internet websites 400-1, 400-2, 400-3 and the like for the occurrence of the data breach 340 (i.e., the posting of or making available the first data records 410 at the Internet websites 400-1, 400-2, 400-3). In specific embodiments of the system 100, the monitoring is continuous, such that, in immediate response to the first data records 370 are posted or otherwise made available at the Internet website 400-1, 400-2, 400-3, the data obfuscation and dissemination engine 330 is configured to determine the data breach 340, retrieve the data records 350 from the database 500, apply the obfuscation algorithms 360 to generate the modified data records 370 and disseminate/post the modified data records 370 to the respective one of the Internet websites 400-1, 400-2, 400-3. In this regard, the modified data records 370 are generated and disseminated (e.g., posted or made available) at the Internet website in real-time or near-real time to when the original/actual first data records 410 are posted or made available at the respective one of the Internet websites 400-1, 400-2, 400-3. By posting or making available the modified data records 370 within real-time or near-real-time to when the original/actual first data records 410 are posted or made available, the present invention limits the likelihood that a would-be accessor/acquirer accesses/acquires the first data records 410 and, instead, increases the likelihood that a would-be accessor/acquirer accesses/acquires the modified data records 370.

In second embodiments of the system 100, the data obfuscation and dissemination engine 330 is configured to determine the occurrence of the data breach 340 through secondary means, such as via one or more cyber security systems 600 that are configured to determine the occurrence of the data breach 340 and notify the data obfuscation and dissemination engine 330 of the occurrence of the data breach 340. In such embodiments of the system 100, the cyber security systems 600 may be internal cyber security systems or third-party cyber security systems employed by the entity tracking data breaches of their data. The cyber security systems may be configured to monitor the Internet websites for data breaches 340 (i.e., the posting or making available of the first data records 410 at the Internet websites 400-1, 400-2, 400-3) or may be configured to employ any other known or future known means for determining the occurrence of the data breach 340 at the internet websites 400-1, 400-2, 400-3. The notification communicated from the cyber security system(s) 500 to the data obfuscation engine 330 indicating the data breach 340 may communicated over the distributed communication network or any other wired or wireless network and may include, but is not limited to, the identity of the first data records 410, the Internet website 400 where the data breach 340 is or has occurred and any other information related to the data breach 340 (e.g., when the data breach was determined to have occurred, identity/location of the poster or the like). Similar to the monitoring that may be configured to occur within the data obfuscation and dissemination engine 330, the determination of the data breach 340 by the cyber security systems 600 may occur within real-time or near-real-time of the posting or making available of the first data records 410 at the Internet websites. In such instances, the subsequent notification may be communicated to the data obfuscation and dissemination engine 330 in real-time or near-real time and, in response, the the data records 350 may be retrieved from the database 500, the modified data records 370 generated and disseminated/posted the respective one of the Internet websites 400-1, 400-2, 400-3 within real-time or near-real-time of the occurrence of the data breach 340.

Referring to FIG. 3, a block diagram is depicted of a computing platform 300 including a data obfuscation and dissemination engine 330, in accordance with embodiments of the present invention, The computing platform 300 which may comprise one or more devices (e.g., application server(s) or the like), is configured to execute software programs, including engines, instructions, algorithms, modules, routines, applications, tools and the like. Computing platform 300 includes memory 310 and the like which may comprise volatile and non-volatile memory, such as read-only and/or random-access memory (RAM and ROM), EPROM, EEPROM, flash cards, or any memory common to computing platforms). Moreover, memory 310 and the like may comprise cloud storage, such as provided by a cloud storage service and/or a cloud connection service.

Further, computing platform 300 also includes at least one processing device 320, which may be an application-specific integrated circuit ("ASIC"), or other chipset, logic circuit, or other data processing device configured to execute stored software/firmware including data obfuscation and dissemination engine 330 or the like. Processing device(s) 320 or the like may execute one or more application programming interface (APIs) (not shown in FIG. 3) that interface with any resident programs, such as data obfuscation and dissemination engine 330 or the like stored in the memory 310 of the computing platform 300 and any external programs. Processing device(s) 320 may include various processing subsystems (not shown in FIG. 3) embodied in hardware, firmware, software, and combinations thereof, that enable the functionality of computing platform 300 and the operability of computing platform 300 on distributed communications network 200 (shown in FIGS. 1 and 2). For example, processing subsystems allow for initiating and maintaining communications and exchanging data with other networked devices, such as database server 500 and Internet servers/websites 400-1, 400-2 and 400-3 (shown in FIGS. 1 and 2). For the disclosed aspects, processing subsystems of computing platform 300 may include any processing subsystem used in conjunction with data obfuscation and dissemination engine 330 and related engines, tools, routines, sub-routines, algorithms, sub-algorithms, sub-modules thereof.

Computing platform 300 additionally includes a communications module (not shown in FIG. 3) embodied in hardware, firmware, software, and combinations thereof, that enables electronic communications between computing platform 300 and other network devices, such as, but not limited to, database server 500 and internet servers/websites 400. Thus, communication module may include the requisite hardware, firmware, software and/or combinations thereof for establishing and maintaining a network communication connection with one or more network devices.

Memory 310 stores data obfuscation and dissemination engine 330, which, as described in relation to FIGS. 1 and 2, is configured to provide data security by generating and disseminating modified data records, including mock/benign data, to Internet websites that post or make available the original data records, in accordance with embodiments of the present invention.

Specifically, data obfuscation and dissemination engine 330 is configured to determine an occurrence of a data breach 340 of first data records 410. The data breach 340 releases/posts or otherwise makes available the first data records 410 at an Internet website 400. The Internet website 400 may be a website accessible via a conventional web browser, e.g., a social media website, bulletin board-type website or the like or may be a website accessible via an anonymizer web browser, e.g., black market/dark website or the like. In specific embodiments of the invention, the data obfuscation and dissemination engine 330 is configured to determine the occurrence of the data breach by monitoring 380 the Internet websites and, specifically real-time monitoring 380, so that once a data breach 340 is determined to have occurred through monitoring, the data records are modified and posted or made available at the same Internet website 400 at which the data breach 340 is occurring at real-time or near-real-time. In other specific embodiments of the invention, the data obfuscation and dissemination engine 330 is configured to determine the occurrence of the data breach 340 by an ancillary cyber security system 600 that is configured to send electronic communication that notifies the engine 330 of the occurrence of the data breach 340 and provides requisite details of the data breach 340. The cyber security system 600 may use any known or future known means to determine the occurrence of a data breach 340.

In specific embodiments of the invention, the data obfuscation and dissemination engine 330 is further configured to determining the volume 380 of data records 350 including first data records 410 to retrieve from the database 500 (shown in FIGS. 1 and 2) and/or generate modified data records. Such a determination may be based on the volume of first data records 410, the type of confidentiality/private information in the first data records 410, the Internet website 400 at which the data breach 340 occurred and the like. As previously described in most instances it is advantageous to retrieve, modify and post to the Internet website 400 a volume of data records 350 that exceeds and, in most instances significantly exceeds, the volume of first data records 410 posted or made available at the Internet website 400.

Further, the data obfuscation and dissemination engine 330 is configured to apply one or more obfuscation algorithms 360 to generate modified data records 370 that modify at least a portion of the data elements values in the plurality of data records 350. As previously discussed, modified data records include data elements that have invalid data element values but are otherwise comprehensible to a reader. (i.e., data element values that appear as though they are valid when, in fact, they are not). In specific embodiments of the invention, the obfuscation algorithm(s) 360 are mutation fuzzing-type algorithms 362 that are configured to make incremental changes to data elements values, so that the data elements appear to be valid. In specific embodiments of the inventions, the obfuscation algorithm(s) 360 are configured to modify a predetermined number 364 of data elements in each data record 350, while in other embodiments of the invention, the obfuscation algorithm(s) 360 are configured to modify a random number 365 of data elements in each data record 350.

In further specific embodiments of the invention, the obfuscation algorithms are configured to intelligently pre-determine 366 which data elements to modify based on one or more data element or data element value attributes. For example, in specific embodiments of the method, more common data element values are modified (e.g., a common name, a common street name or the like), while in other specific embodiments of the method, common data elements values are precluded from modification. In other embodiments of the method, the algorithms are configured to determine which data elements contain private, confidential and/or non-public information and modify the values of such data elements. In other embodiments of the invention, the obfuscation algorithm(s) are configured to randomly determine 366 which of the data elements to modify.

The data obfuscation and dissemination engine 330 is further configured to disseminate the modified data records 370 to the Internet website 400 at which the data breach 340 occurred. Disseminating may include posting the actual modified data records at the Internet website or provide a post at the Internet website that makes the modified data records available (e.g., offer for sale or the like). In specific embodiments of the invention, prior to dissemination, the data obfuscation and dissemination engine 330 is configured to format the modified data records 370 in a same or similar file format 372 used in the posting of the first data records 410 at the Internet website 400. In those embodiments of the method in which the dissemination makes the modified data records available at the Internet website, prior to dissemination the data obfuscation and dissemination engine 330 is configured to determine other parameters associated with the posting, such as terms for acquiring the modified data records (e.g., price and the like) and/or specific wording presented in the posting.

In further embodiments of the invention, the memory 310 of computing platform 300 stores data access/use monitoring engine 390 that is configured to, in response to disseminating the modified data records 370 at the Internet website 400, monitor/track subsequent access and/or use of the modified data records 370 to determine physical and/or network location of the accessor/acquirer and/or the identity of the accessor/acquirer 392. For example, in specific embodiments of the method, the modified data records may include logic that is configured to electronically signal/notify the entity in rightful possession of the data when the modified data is accessed/used, the physical and/or network location of the access and the like. In other embodiments of the method in which the modified data records are made available at specified terms/cost, access/use may be tracked in response to an acquirer purchasing the modified data records (e.g., identity determined though applicable financial account or the like). In other embodiments of the invention, use of the modified data is tracked in applications configured to receive such data. In such embodiments, the applications, which may be applications implemented by the entity in rightful possession of the data, are configured to identify the specific modified data element values and, in response, determine or attempt to determine location and/or identity of the user.

Referring to FIG. 4, a flow diagram is depicted of a method 700 for data security, in accordance with embodiments of the present invention. At Event 710, an occurrence of a data breach of first data records in determined/identified. The data breach releases/posts or otherwise makes available the first data records at an Internet website. Typically, the individual/entity releasing or making available the data records will have acquired the data records without the authorization of the entity in rightful possession of the data records. In this regard, the data records are released or made available for purposes of causing harm to the entity in rightful possession of the data records and/or for financial gain. As previously discussed, the Internet website may be a website accessible via a conventional web browser, e.g., a social media website, bulletin board-type website or the like or may be a website accessible via an anonymizer web browser, e.g., black market/dark website or the like. Additionally, as previously discussed, in specific embodiments of the method, the occurrence of the data breach may determined by monitoring the websites and, specifically real-time monitoring, so that once a data breach is determined to have occurred, the method of the present invention can be executed in real-time or near-time so that modified data records are posted or made available at the same Internet website at which the breach is occurring or has occurred. In other specific embodiments of the method, the occurrence of the data breach may be determined/identified by an ancillary cyber security system that is configured to send electronic communication that notifies of the occurrence of the data breach and provides requisite details of the data breach.

At Event 720, a database associated with the first data records and the Internet website are identified. The data base may be the same database from which the breach occurred or is associated with or a different database storing the first data records. In response to identifying the database, at Event 730, a plurality of data records including the first data records are retrieved from the database. As previously discussed, in most embodiments of the method, a larger volume of data records is retrieved and subsequently modified and released/made available at the Internet website in comparison to the data records that have incurred the data breach. By generating and releasing a larger volume of modified data records at the Internet website intent is to entice a would-be accessor/acquirer to access/acquire the modified data records as opposed to the first data records, which include accurate/valid data values. Additionally, in specific embodiments the method may include determining the volume of data records to retrieve and/or generate modified data records. Such a determination may be based on the volume of first records, the type of confidentiality/private information in the first data records, the Internet website at which the data breach occurred and the like.

At Event 740, one or more obfuscation algorithms are applied to generate modified data records that modify at least a portion of the data elements values in the plurality of data records. Modified data elements are inaccurate/invalid data element values that are otherwise comprehensible to a reader. In specific embodiments of the method, the obfuscation algorithm(s) are mutation fuzzing-type algorithms that make small changes to data elements values, so that the data elements appear to be valid. In specific embodiments of the method, the algorithms are configured to randomly determine the number of data elements to modify while in other embodiments of the method a predetermined number of data elements in each data record are modified. In further specific embodiments of the method, the data elements in the data records that are modified are randomly determined, while in other embodiments of the method, the algorithms are configured to intelligently determine which data elements to modify based on one or more data element or data element value attributes. For example, in specific embodiments of the method, more common data element values are modified (e.g., a common name, a common street name or the like), while in other specific embodiments of the method, common data elements values are precluded from modification. In other embodiments of the method, the algorithms are configured to determine which data elements contain private, confidential and/or non-public information and modify the values of such data elements.

At Event 750, the modified data records are disseminated to the Internet website at which the data breach occurred. Disseminating may include posting the actual modified data records at the Internet website or provide a post at the Internet website that makes the modified data records available (e.g., offer for sale or the like). Prior to disseminating the modified data records the data records may be formatted in a file format that is the same and/or consistent with the file format used in the posting of the first data records at the Internet website. In those embodiments of the method in which the dissemination makes the modified data records available at the Internet website, prior to dissemination a determination may be made as to terms for acquiring the modified data records (e.g., price and the like) and/or a determination may be made as the wording presented in the posting. The determination of terms and post wording is made based on the data breach of the first data records and, as such, the terms of the modified data records are made to be more favorable than the terms associated with the first data records. Moreover, the post wording should be such that it entices a would-be accessor/acquirer to access or acquire the modified data records over the first data records.

In optional embodiments of the invention, once the modified data records have been disseminated to the Internet website, subsequent access and/or use of the data may be tracked to determine physical and/or network location of the accessor/acquirer and/or the identity of the accessor/acquirer. For example, in specific embodiments of the method, the modified data records may include logic that is configured to electronically signal/notify the entity in rightful possession of the data when the modified data is accessed/used, the physical and/or network location of the access and the like. In other embodiments of the method in which the modified data records are made available at specified terms/cost, access/use may be tracked in response to an acquirer purchasing the modified data records (e.g., identity determined though applicable financial account or the like). In other embodiments of the invention, use of the modified data is tracked in applications configured to receive such data. In such embodiments, the applications, which may be applications implemented by the entity in rightful possession of the data, are configured to identify the specific modified data element values and, in response, determine or attempt to determine location and/or identity of the user.

As evident from the preceding description, the systems, methods and the like described herein represents an improvement in data security and, specifically, generation and dissemination of modified data records in response to determining that data breach has occurred resulting in the data records being released or otherwise made available at an Internet website. The modified data records, which include so-called mock/benign data (i.e., data elements that have been modified with values that appear real but are actually incorrect) are disseminated (i.e., posted or otherwise made available) to the same Internet site at which the original data records are posted or otherwise are available. In specific embodiments of the invention, the modified data records are made to be more enticing to a would-be acquirer of the data than the original data records. In this regard, the modified data records may contain significantly more records than the original data records and/or be offered to the would-be acquirer at better terms. In other embodiments of the invention, the modified data is tracked to determine use of the modified data post-acquisition as an attempt at identifying physical and/or network location of the user or an identity of the acquirer/user.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for data security, the system comprising:
 a computing platform including a memory and one or more processing devices in communication with the memory;
 a data obfuscation and dissemination engine stored in the memory, executable by the one or more processing devices and configured to:
  determine an occurrence of a data breach of first data records by monitoring a plurality of Internet websites and determining that the first data records have been posted to or are available at a monitored Internet website, wherein the data breach releases or makes available the first data records at an Internet website;

identify (i) a database storing a plurality of data records including the first data records, and (ii) the Internet website;

determine a volume of the plurality of data records to retrieve, modify and disseminate based on (i) a volume of the first data records posted to or available at the monitored website, (ii) a type of confidential data in the first data records, and (iii) the Internet website;

retrieve the determined volume of the plurality of data records including the first data records from the database;

apply one or more obfuscation algorithms to the determined volume of the plurality of data records to generate modified data records that modify at least a portion of the data elements in the plurality of data records, wherein the modified data records comprise inaccurate data elements that are comprehensible; and disseminate the modified data records by posting the modified data records at the monitored Internet website or making the modified data records available to visitors of the monitored Internet website.

2. The system of claim 1, further comprising one or more cyber security systems in network communication with the data obfuscation and dissemination engine, wherein the one or more cyber security systems are configured to determine the occurrence of the data breach of the first data records and notify the data obfuscation and dissemination engine of the data breach.

3. The system of claim 1, wherein the one or more obfuscation algorithms are configured to modify a predetermined number of data elements in the plurality of data records.

4. The system of claim 1, the one or more obfuscation algorithms are configured to randomly select the data elements in the plurality of data records for modification.

5. The system of claim 1, the one or more obfuscation algorithms are configured to select, based on predetermined data element attributes, the data elements in the plurality of data records for modification.

6. The system of claim 1, wherein the data obfuscation and dissemination engine is further configured to generate a file comprising modified data records and disseminate the file to the Internet website, wherein the file is of a type similar to or same as a type of file containing the first data records released or made available at the Internet website.

7. The system of claim 1, further comprising a data access monitoring engine stored in the memory, executable by the one or more processing devices and configured to:
   monitor access to the modified data records at the Internet website; and
   based on the monitoring resulting in an access of the modified data records, determine at least one of (i) a network location of an accessor, (ii) a physical location of an accessor, and (iii) identity of an accessor of the modified data records.

8. A computer-implemented method for data security, the method is executed by one or more computing processor devices and comprising:
   determining an occurrence of a data breach of first data records by monitoring a plurality of Internet websites and determining that the first data records have been posted to or are available at a monitored Internet website, wherein the data breach releases or makes available the first data records at an Internet website;
   identifying (i) a database storing a plurality of data records including the first data records, and (ii) the Internet website;
   determining a volume of the plurality of data records to retrieve, modify and disseminate based on (i) a volume of the first data records posted to or available at the monitored website, (ii) a type of confidential data in the first data records, and (iii) the Internet website;
   retrieving the determined volume of the plurality of data records including the first data records from the database;
   generating modified data records that modify at least a portion of the data elements in the determined volume of the plurality of data records, wherein the modified data records comprise inaccurate data elements that are comprehensible; and
   disseminating the modified data records by posting the modified data records at the monitored Internet website or making the modified data records available to visitors of the monitored Internet website.

9. The computer-implemented method of claim 8, wherein determining the occurrence of the data breach further comprises receiving a notification from a cyber security system that is configured to notify as to the occurrence the data breach.

10. The computer-implemented method of claim 8, wherein generating the modified data records further comprises one selected from a group consisting of (i) randomly selecting the data elements in the plurality of data records for modification, and (ii) selecting, based on predetermined data element attributes, the data elements in the plurality of data records for modification.

11. A non-transitory computer-readable medium storing thereon executable instructions that, as a result of being executed by one or more processors of a computing system, cause the computing system to:
   determine an occurrence of a data breach of first data records by monitoring a plurality of Internet websites and determining that the first data records have been posted to or are available at a monitored Internet website, wherein the data breach releases or makes available the first data records at an Internet website;
   identify (i) a database storing a plurality of data records including the first data records, and (ii) the Internet website;
   determine a volume of the plurality of data records to retrieve, modify and disseminate based on (i) a volume of the first data records posted to or available at the monitored website, (ii) a type of confidential data in the first data records, and (iii) the Internet website;
   retrieve the determined volume of the plurality of data records including the first data records from the database;
   generate modified data records that modify at least a portion of the data elements in the determined volume of the plurality of data records, wherein the modified data records comprise inaccurate data elements that are comprehensible; and
   disseminate the modified data records by posting the modified data records at the monitored Internet website or making the modified data records available to visitors of the monitored Internet website.

12. The non-transitory computer-readable medium of claim 11, wherein the executable instructions that cause the computing system to determine the occurrence of the data breach are further configured to cause the computing system to receive a notification from a cyber security system that is configured to notify as to the occurrence the data breach.

\* \* \* \* \*